Figure 1:
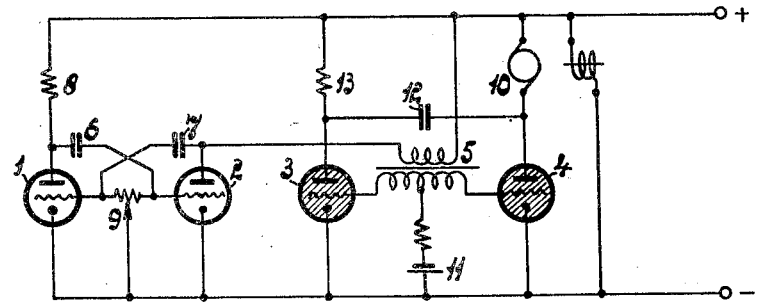

Feb. 5, 1957          H. HERTWIG          2,780,763

GAS DISCHARGE TUBE SYSTEM FOR MOTOR CONTROL

Filed June 5, 1953

INVENTOR
HARRY HERTWIG
BY
AGENT

2,780,763
GAS DISCHARGE TUBE SYSTEM FOR MOTOR CONTROL

Harry Hertwig, Hamburg, Germany, assignor to Hartford National Bank and Trust Company, Hartford, Conn., as trustee Application June 5, 1953, Serial No. 359,936

Claims priority, application Germany June 14, 1952

7 Claims. (Cl. 318—345)

The present invention relates to devices for controlling the energy supplied to a load. More particularly, the invention relates to devices for controlling the speed of direct-current motors and more particularly of direct-current shunt motors, the armatures of which are fed by way of grid-controlled gaseous or vapor discharge tubes.

Devices are known by which the speed of such motors is controlled by feeding the circuit of the armature from the alternating-current supply source by way of grid-controlled discharge tubes. The speed of the motor is determined by variation of the moments of ignition of the discharge tubes during the positive half-waves of the alternating supply voltage.

Such devices require alternating current. Also, they have the disadvantage that a very small torsional moment only can be obtained at small conducting periods of the discharge tubes due to the sinusoidally varying anode voltage, so that the speed-control range is narrowly limited in case of a load. The present invention mitigates the stated disadvantages and aims at the full use of the power of a direct-current motor, to be controlled in speed, by feeding the motor at its maximum speed a direct voltage which temporarily is substantially constant.

According to the invention, the armature of the motor to be controlled is supplied from a direct-voltage source by way of a controllable gaseous or vapor discharge tube which is alternately cut-off or ignited periodically, the mean consumption of energy and hence the speed of the motor being favorably influenced by variation of the ratio between the cut-off and conduction periods.

This may preferably be carried out in such manner that the tube feeding the armature is ignited by grid-voltage pulses superposed on a negative direct-voltage and is extinguished by ignition of a second controllable gaseous or vapor discharge tube.

In an advantageous embodiment of the invention the grid-voltage pulses serving to alternately ignite the two tubes are derived from a relaxation oscillator which permits the varying of the temporary sequence of the igniting and extinguishing pulses at a substantially constant sawtooth frequency.

According to the invention, the relaxation oscillator used may be a multivibrator by which the time constants determining the sawtooth variation and varying with the coupling capacitors and grid resistors are mutually varied for obtaining variable cut-off periods of the two tubes.

The time-constant in the multivibrator may be varied by means of a potentiometer which is common to the two grid-circuits, so that a substantially constant sawtooth frequency is ensured which is independent of the ratio between the cut-off periods of the two tubes.

An advantageous embodiment of the device of the invention may also comprise a tube circuit of the multivibrator which includes a transformer having derived from it the voltage pulses required for the ignition of the controllable gaseous or vapor discharge tube. These pulses are greatly shortened by differentiation with respect to the rectangular pulses of the multivibrator.

As an alternative, the relaxation oscillator used may be a multivibrator by which the active grid-biasses are varied for obtaining variable cut-off periods of the two tubes.

In order to ensure a speed control, which is dependent upon a direct control-voltage, use may be made in such a device of a controllable electron tube determining the active grid-biasses of the two multivibrator tubes as a function of the direct control-voltage.

Figures 2A, 2B, 2C:
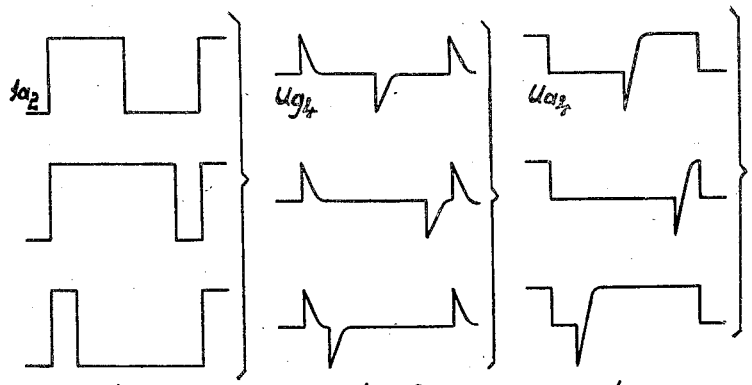
Figure 3:
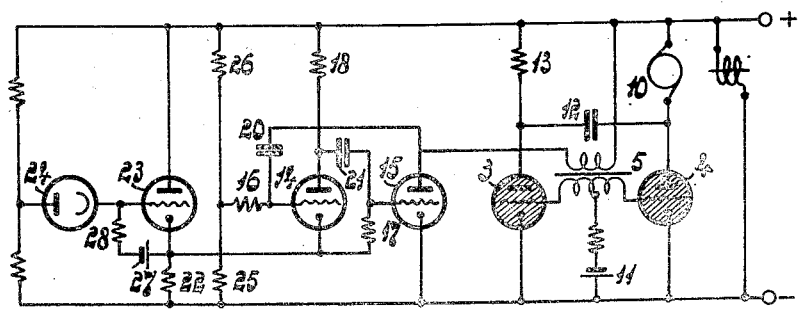

In order that the invention may be readily carried into effect, it will now be described with reference to the accompanying drawing, wherein:

Fig. 1 is a schematic diagram of an embodiment of the device of the present invention;

Figs. 2a, 2b, and 2c are graphical presentation of voltage and current diagrams associated with the embodiment of Fig. 1 and helps to explain its operation; and Fig. 3 is a schematic diagram of another embodiment of the device of the present invention.

Referring now to Fig. 1, the pulse producer is a sawtooth multivibrator device constituted by electron tubes 1 and 2, a transformer 5, capacitors 6 and 7, a resistor 8 and a potentiometer 9. Their natural frequency is determined by the time-constants of the capacitors 6, 7 and the partial resistances of potentiometer 9.

Such sawtooth devices, when suitably proportioned, provide substantially rectangular current curves in the separate circuits of the tubes.

By varying the time-constants with respect to one another it is possible to adjust a corresponding ratio between the cut-off times of the two tubes. This is effected with the use of the potentiometer 9.

The anode circuit of tube 2 includes the primary winding of the transformer 5. When the tube 2 passes from the cut-off condition to the conductive condition, a voltage pulse is set up across the secondary winding. The secondary winding is included in the grid circuit of a gaseous or vapor discharge tube 4 feeding the armature 10, in such manner that the tube 4, which is cut-off by an auxiliary voltage source 11, is ignited by the said voltage pulse of positive polarity. The voltage pulse which simultaneously occurs at the grid of a second gaseous or vapor discharge tube 3 via the second secondary winding is of negative polarity, so that this tube remains cut-off.

When the tube 2 returns to the cut-off condition, voltage pulses of inverse polarity occur across the secondary side of transformer 5 and tube 3 is ignited. A transient decrease in voltage to below the operating voltage then occurs, by way of a capacitor 12, at the anode of tube 4 with the result that tube 4 extinguishes. This process of alternately igniting and extinguishing takes place with the frequency of the multivibrator, the conductive periods of tube 4 being determined by the position of the tapping on the potentiometer 9. The times of charge and discharge of capacitor 12 are determined by a resistor 13 and the resistance of the armature 10, respectively, which times are to be as short as possible by suitable choice of capacitor 12.

Fig. 2 shows graphically the variation in time for three positions of the potentiometer 9. Fig. 2a shows the temporary variation of the anode current in tube 2. Fig. 2b the voltage pulses occurring at the grid of tube 4, and Fig. 2c shows the temporary variation in the anode voltage of tube 4.

A further development of the principle of the invention for obtaining automatic speed control is shown in Fig. 3. It shows the arrangement of the pulse devices for a circuit in which the width of the pulses is varied by way of another controllable electron tube as a function of a direct control-voltage supplied by a measuring member. In the example chosen, the measuring member is a photo-electric cell. The method will be explained more fully hereinafter.

Tubes 14 and 15, together with resistors 16, 17, 18, the transformer 5 and capacitors 20 and 21, constitute a relaxation oscillator. However, in contradistinction with the device shown in Fig. 1, the ratio between the cut-off times of the two tubes, instead of being varied by variation of the instantaneous time-constants obtained from the coupling capacitors and the grid resistances, is varied by variation of the grid-biases of the tubes 14 and 15. During the charge and discharge of the coupling capacitors the grid tends to assume the potential determined by the grid-bias, the charge and discharge taking place only to the value of the grid-potential at which anode current starts to flow in the tube concerned.

The time interval for the partial charge and discharge to the beginning of the current flow in the tube may thus be controlled within wide limits by varying the active grid-bias despite a given invariable time-constant. The grid-bias alternately active at the tubes 14 and 15 is influenced by the voltage drop at a cathode resistor 22 of a control tube 23. In the rest position, that is with a photo-electric cell 24 unexposed and tube 23 cut off by a battery 27, the grid-bias of tube 15 is assumed to be, for example, zero and the grid of tube 14 is assumed to be positively biased by a potentiometer 25, 26 by way of a grid resistor 16. In this condition the cut-off time of tube 15 is maximum. However, when the photo-electric cell 24 is exposed, the voltage drop at resistor 28 causes the grid of tube 23 to become more positive, a control voltage across the cathode resistor 22 being produced as a result of the beginning cathode current. The active grid-bias of tube 14 thus becomes more negative, whereas that of tube 15 becomes more positive. The ratio between the cut-off times thus varies in the sense of shorter cut-off times for tube 15; a speed control within wide limits thus being provided with the use of the control circuit for the motor speed control shown in Fig. 1.

When the grid-bias of tube 14 at maximum exposure of the photo-electric cell 24 becomes negative to such extent that the pulse stage is about to be cut off, the rectifying tube 4 feeding the armature 10 remains ignited and a direct-voltage supply for the motor is produced.

At the lowest speeds, the armature 10 receives transient current pulses, but these are so high due to the full rated voltage being applied and substantially complete absence of a counter voltage that a high instantaneous torsional moment occurs. The possibility of intermittent torsional movements may be reduced as much as possible to a permissible minimum by means of mechanical transmissions and flywheels. The speed control ranges obtainable are 1:1000.

The numbers of pulses preferably are approximately 1 to 5 per sec., the shortest pulse duration being about 0.01 sec.

While the invention has been described by means of specific examples and in specific embodiments, I do not wish to be limited thereto, for obvious modifications will occur to those skilled in the art without departing from the spirit and scope of the invention.

What is claimed is:

1. A device for controlling the energy supplied to a load, comprising a first discharge device having an ionizable medium connected in series with said load, means for applying a direct voltage across the series-connected discharge device and load, and means for applying a voltage to said discharge device to provide periods of conduction and periods of non-conduction in said discharge device, said applying means including a second discharge device having an ionizable medium coupled to said first discharge device, means for applying a bias voltage to said discharge devices to render same normally inoperative, a relaxation oscillator circuit connected to said first and second devices and adapted to produce a plurality of first pulses having a given polarity and a plurality of second pulses of opposite polarity, said first and second pulses recurring in alternate time sequence, said relaxing oscillator circuit further comprising means for varying the time spacing between the consecutive pulses, and means for applying said first pulses to said first discharge device to initiate said period of conduction therein and said second pulses to said second discharge device to initiate said period of non-conduction in said first discharge device.

2. A device as set forth in claim 1, wherein said load includes a direct current motor armature.

3. A device as set forth in claim 1, wherein said relaxation oscillator circuit includes a multivibrator having two discharge tubes each having a grid, coupling capacitors and grid resistors, the values of said resistors and capacitors being mutually variable for obtaining variable cut-off periods of said two tubes.

4. A device as set forth in claim 3, wherein said grid resistors include a potentiometer common to grid circuits of said two tubes.

5. A device as set forth in claim 1, wherein said relaxation oscillator circuit includes a transformer for producing short differentiated pulses to said first and second discharge devices.

6. A device for controlling the energy supplied to a load, comprising a first discharge device having a control grid and an ionizable medium connected in series with said load, means for applying a direct voltage across the series-connected discharge device and load, and means for applying a voltage to said discharge device to provide periods of conduction and periods of non-conduction in said discharge device, said applying means including a second discharge device having an ionizable medium coupled to said first discharge device, means for applying a bias voltage to said discharge devices to render same normally inoperative, a multivibrator having two discharge tubes each having a grid, said multivibrator being connected to said first and second devices and being adapted to produce a plurality of first pulses having a given polarity and a plurality of second pulses of opposite polarity, said first and second pulses recurring in alternate time sequence, and means for applying said first pulses to said first discharge device to initiate said period of conduction therein and said second pulses to said second discharge device to initiate said period of non-conduction in said first discharge device, said multivibrator further including means for varying the active grid biases of said two tubes for obtaining variable cut-off periods of said two tubes.

7. A device as set forth in claim 6, wherein the means for varying the active grid biases includes a controllable electron tube for producing a direct control voltage and means for applying said control voltage to said two discharge tubes.

References Cited in the file of this patent
UNITED STATES PATENTS 2,549,654  Wittenberg _____ Apr. 17, 1951